(12) United States Patent
Palleti et al.

(10) Patent No.: US 9,760,643 B2
(45) Date of Patent: Sep. 12, 2017

(54) SYSTEMS AND METHODS FOR IDENTIFYING ELECTRONIC CONTENT

(75) Inventors: Pallavi Palleti, Bangalore (IN); Rohini Uppuluri, Bangalore (IN); Ian Holsman, Richmond (AU)

(73) Assignee: AOL Inc., Dulles, VA (US)

( * ) Notice: Subject to any disclaimer, the term of this patent is extended or adjusted under 35 U.S.C. 154(b) by 1084 days.

(21) Appl. No.: 12/757,342

(22) Filed: Apr. 9, 2010

(65) Prior Publication Data
US 2011/0252050 A1 Oct. 13, 2011

(51) Int. Cl.
*G06F 17/30* (2006.01)

(52) U.S. Cl.
CPC .... *G06F 17/3087* (2013.01); *G06F 17/30876* (2013.01)

(58) Field of Classification Search
USPC .......................................................... 707/769
See application file for complete search history.

(56) References Cited

U.S. PATENT DOCUMENTS

| | | | |
|---|---|---|---|
| 6,353,398 B1 | 3/2002 | Amin et al. | |
| 6,741,188 B1 | 5/2004 | Miller et al. | |
| 7,231,405 B2 | 6/2007 | Xia | |
| 7,403,939 B1 | 7/2008 | Virdy | |
| 7,774,342 B1 | 8/2010 | Virdy | |
| 2005/0080786 A1* | 4/2005 | Fish et al. | 707/10 |
| 2006/0059225 A1 | 3/2006 | Stonehocker et al. | |
| 2006/0069618 A1 | 3/2006 | Milener et al. | |
| 2007/0168208 A1 | 7/2007 | Aikas et al. | |
| 2007/0233864 A1 | 10/2007 | Xie et al. | |
| 2007/0288437 A1 | 12/2007 | Xia | |
| 2008/0091537 A1 | 4/2008 | Miller et al. | |
| 2008/0134042 A1 | 6/2008 | Jankovich | |
| 2008/0201413 A1 | 8/2008 | Sullivan et al. | |
| 2008/0243821 A1* | 10/2008 | Delli Santi et al. | 707/5 |
| 2008/0299989 A1 | 12/2008 | King et al. | |
| 2008/0320078 A1 | 12/2008 | Feldman et al. | |
| 2009/0070293 A1* | 3/2009 | Vechersky | 707/3 |
| 2009/0204481 A1 | 8/2009 | Navar et al. | |
| 2010/0082526 A1 | 4/2010 | Wassingbo | |
| 2010/0279665 A1* | 11/2010 | Hardin et al. | 455/414.1 |
| 2011/0202514 A1* | 8/2011 | Singh | 707/706 |

OTHER PUBLICATIONS

Notification of Transmittal of the International Search Report and the Written Opinion of the International Searching Authority dated Jul. 26, 2011, in corresponding International Application No. PCT/US2011/031539 (11 pages).

* cited by examiner

*Primary Examiner* — Alexander Khong
(74) *Attorney, Agent, or Firm* — Finnegan, Henderson, Farabow, Garrett & Dunner LLP

(57) ABSTRACT

Systems and methods are provided for identifying electronic content based on browsing history and positional or geographic information. In one implementation, popular web pages are identified that have been recently accessed by users within a geographic region associated with a client device. According to a method, a geo-spatial identifier of a geographic region associated with a client device is obtained, and data records associated with the geo-spatial identifier are retrieved from a database. Popular web sites or pages are identified from the data records, based on a number of requests for the web pages, and a number of users that requested the web pages in the geographic region.

28 Claims, 15 Drawing Sheets

_200_

Identifier: 55857856 — _202_
  Region: Crystal City — _204_
    Municipality: Arlington — _206A_
      County: Arlington — _206B_
        State: Virginia — _206C_
          Country: United States — _206D_
Centroid: — _208_
  latitude: 38.8562
  longitude: -77.0518
Boundaries:
  Southwest:
    latitude: 38.8453 — _210_
    longitude: -77.0569
  Northeast:
    latitude: 38.8670 — _212_
    longitude: -77.0466
Neighbors:
  Aurora Highlands
  Pentagon City
  Reagan National Airport — _214_

FIG. 2

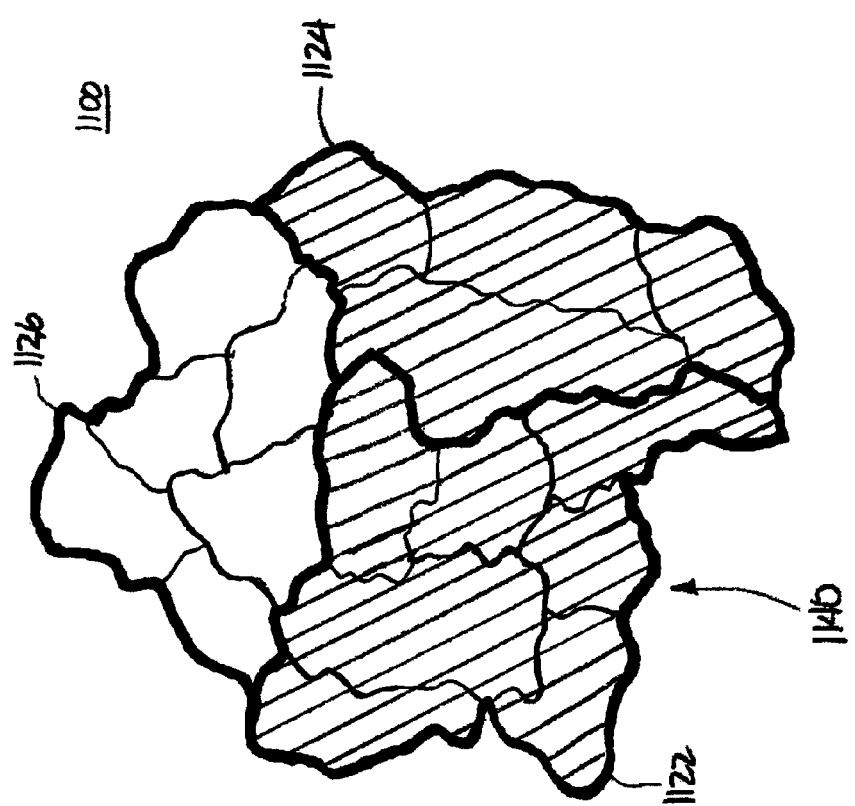

SYSTEMS AND METHODS FOR IDENTIFYING ELECTRONIC CONTENT

BACKGROUND

Technical Field

The present disclosure generally relates to techniques for identifying electronic content based on, for example, a browsing history and geographic data. In particular, and without limitation, the present disclosure relates to systems and methods for providing for identifying electronic content, such as popular web sites or pages, based on a browsing history of users in a geographic region.

Background Information

Today, the Internet represents a vital information resource for both the sophisticated user and the novice. The popularity of the Internet as an information source is due, in part, to the vast amount of information available and to the relative ease with which that information may be accessed. However, the enormous amount of information that is available on the Internet can render the location of specific or the most relevant information daunting, even for a sophisticated user.

Many web sites, and in particular, those associated with online retailers, provide links to popular web pages. For example, a web site of an online retailer may recommended links that are popular with users who have viewed the retailer's web site, or recommended links to products that are popular with users who have purchased a particular product. However, while these recommended links may provide a global or general indication of popularity, they provide no insight on those products or pages that may be popular with users in specific geographic regions.

Web sites may leverage a registration process to provide location-specific content to users. For example, a registered user of a web site in Washington, D.C. may receive, upon request, a "local" version of web page of a Washington, D.C. web page, but not a national version of the web page. However, while providing location-specific content, such registration-based delivery processes may fail to account for the popularity of the delivered content within a particular geographic region.

In view of the foregoing, there is a need for improved systems and methods for automatically identifying and generating recommendations of electronic content based on, for example, a browsing history of users in a geographic region. Such systems and methods may be implemented in computer-based environments, such as the Internet and network environments that provide online content to users.

SUMMARY

Consistent with embodiments of the present disclosure, a computer-implemented methods are provided for identifying electronic content. In one exemplary embodiment, the method obtains a geographic region associated with a client device and a geo-spatial identifier associated with the geographic region. Data records associated with the geo-spatial identifier are retrieved from a database. The data records include popularity data for electronic content requested by other client devices within the geographic region. The method processes the data records to identify popular electronic content within the geographic region based on the popularity data of the data records.

Consistent with additional embodiments of the present disclosure, a computer-implemented method is provided for identifying electronic content. In one embodiment, the method transmits, to a server, an identifier of a client device associated with a geographic region, and receives, from the server, the identification of popular electronic content associated with the geographic region of the client device that is identified based on at least one of (i) a number of requests for the popular electronic content or (ii) a number of users that requested the popular electronic content within the geographic region. The popular electronic content may be identified or provided to the client device so that it can be, for example, displayed or otherwise communicated to a user.

Consistent with further embodiments of the present disclosure, an apparatus is provided having a storage device and a processor coupled to the storage device. The storage device stores a program for controlling the processor, and the processor, being operative with the program, is configured to obtain a geographic region associated with a client device and a geo-spatial identifier associated with the geographic region. The processor is configured to retrieve data records associated with the geo-spatial identifier from a database. The data records include one or more of (i) a number of requests for the web pages and (ii) a number of users that requested the web pages within the geographic region. The processor is configured to process the data records to identify popular web pages within the geographic region, when the data records are associated with a threshold number of web pages. The popular web pages are identified based on at least one of the number of requests and the number of users.

Other embodiments of the present disclosure relate to a computer-readable medium with stored instructions that, when executed by a processor, perform a method for providing recommendations of electronic content. The method obtains a geographic region associated with a client device and a geo-spatial identifier associated with the geographic region. Data records associated with the geo-spatial identifier are retrieved from a database. The data records include one or more of (i) a number of requests for the web pages and (ii) a number of users that requested the web pages within the geographic region. The method processes the data records to identify popular web pages within the geographic region, when the data records are associated with a threshold number of web pages. The popular web pages are identified based on at least one of the number of requests and the number of users.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

BRIEF DESCRIPTION OF THE DRAWINGS

FIGS. 2 and 3 are diagrams of exemplary data structures, consistent with embodiments of the invention.

FIGS. 11A and 11B are diagrams of expanded regions, consistent with additional embodiments of the invention.

DETAILED DESCRIPTION

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
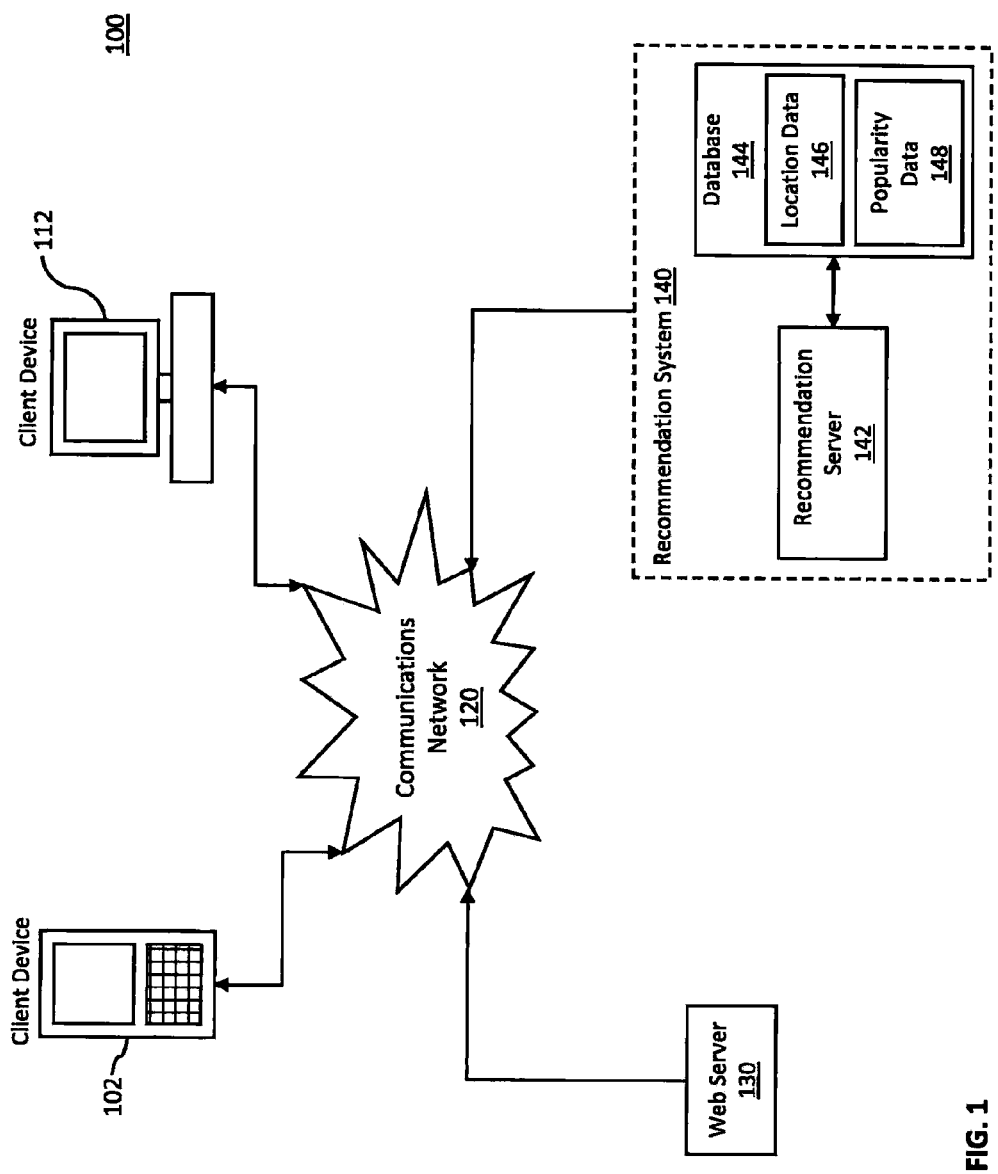
FIG. 1 is a diagram of an exemplary computing environment within which embodiments of the invention may be practiced.

FIG. 1 illustrates an exemplary computing environment 100 within which embodiments of the present invention may be practiced. In FIG. 1, a recommendation system 140, a plurality of client devices including devices 102 and 112, and a web server 130 are interconnected via a communications network 130. In an embodiment, client devices 102 and 112 can include, but are not limited to, a personal computer, a laptop computer, a notebook computer, a hand-held computer, a personal digital assistant, a portable navigation device, a mobile phone, a smart phone, and any additional or alternate computing device apparent to a person of ordinary skill in the art and operable to transmit and receive data across network 120.

Although the exemplary embodiment of FIG. 1 illustrates computing environment 100 with client devices 102 and 112 in communication with web server 130, persons of ordinary skill in the art will recognize that computing environment 100 may include any number of additional number of mobile or stationary client devices, and any number of additional web servers without departing from the spirit or scope of the present invention. Furthermore, although computing environment 100 of FIG. 1 is illustrated with a single web server 130 in communication with a single recommendation system 140 across network 120, persons of ordinary skill in the art would also recognize that web server 130 may be implemented as a server system comprising a plurality of servers and that computing environment 100 can include any number of recommendation systems or web servers in communication with one another without departing from the spirit or scope of the present invention.

Communications network 120 may represent any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow mobile devices to send and receive data via applicable communications protocols, including those described above.

Recommendation system 140 includes a recommendation server 142 and a database 144. By way of example, recommendation server 142 and database 144 may be incorporated into a single hardware unit, such as a single computer or server system. In such an embodiment, database 144 may be incorporated into, or stored within, a storage medium or storage device of recommendation server 142, as described in FIG. 2. However, recommendation server 142 and database 144 are not limited to such configurations, and, in additional embodiments, database 144 may reside on any additional or alternate computer or server accessible to recommendation server 142 without departing from the spirit of scope of the present invention.

Database 144 includes location data 146 and popularity data 146. In an embodiment, location data 146 includes data records specifying one or more regions and relationships between these regions. Each data record in location data 146 may be associated with a corresponding region, including but not limited to a neighborhood, a locality or municipality, a country, a state or province, or a country. Further, each data record may also be associated with a unique numerical identifier of the corresponding region.

Further, in an embodiment, the data record associated with a particular region may also indicate a relationship between that particular region and other regions. For example, the data record for the particular geographic region may identify one or more additional regions that are adjacent to the particular region and/or share a portion of a common border with the particular region (i.e., that are "neighboring" geographic regions).

In an embodiment, the data record associated with the particular geographic region may also identify a parent-child relationship between the particular region and other regions. For example, for a region associated with a municipality, a corresponding data record in location data 146 may indicate one or more regions or neighborhoods that are included within the municipality (i.e., that are "children" of the municipality), and may indicate one or more additional regions, e.g., counties, states, and countries, that include the municipality (i.e., that are "parents" of the municipality).

FIG. 2 illustrates an exemplary data record 200 that may be included within location data 146, consistent with disclosed embodiments. Data record 200 is associated with identifier 202, e.g., "55857856," and a region 204, e.g., "Crystal City." In an embodiment, identifier 202 is a geospatial identifier. By way of example, identifier 202 may represent a "Where On Earth ID" (WOEID) assigned to region 204 by the Yahoo Developer Network, and data record 200 may include information in a format compatible with the WOEID. In such embodiments, data record 200 may be generated and stored in plain text, in an appropriate markup language, such as XML, or in any additional or alternate format apparent to a person of ordinary skill in the art.

As discussed above, data record 200 may indicate relationships between region 204 and one or more additional regions. For example, data record 200 may indicate a parent-child relationship between region 204 and one or more additional regions. In FIG. 2, region 204 is included within a parent municipality 206A, e.g., "Arlington," which is included within a parent county 206B, e.g., "Arlington." County 206B is included within a parent state 206C, e.g., "Virginia," which is included within a parent country 206D, e.g., "United States." Although not depicted in FIG. 2, each of parent regions 206A, 206B, 206C, and 206D may be associated with a corresponding identifier, e.g., a WOEID, and may be associated within a corresponding data record within location data 146.

Further, for example, data record 200 may also indicate one or more regions that are "neighbors" to region 204, e.g., that are proximate to and share a portion of a boundary with region 204. For example, region 206 may be associated with neighboring regions 214, e.g., "Aurora Highlands," "Pentagon City," and "Reagan National Airport." Although not depicted in FIG. 2, each of neighboring regions 214 may also be associated with a corresponding identifier, e.g., a WOEID, and a corresponding data record within location data 146.

However, neighboring regions 214 are not limited to those regions that share a portion of a boundary with region 202. In additional embodiments, neighboring regions 214 may include additional regions that may not be immediately adjacent to region 204 and that may not share a common boundary with region 204. For example, a neighboring region may be separated from region 204 by natural barrier, e.g., a river, but may have a population that is demographically similar to that of region 204.

Data record 200 may also include geo-spatial data defining region 204. For example, data record 200 may include data 208 that specifies a latitude and longitude of a centroid of region 204. Further, data record 200 may include data 210 that specifies a latitude and latitude of a southwest boundary of region 204, and data 212 that specifies a latitude and longitude of a northeast boundary of region 204. Further, although depicted in terms of latitude and longitude, data 208, 210, and 212 may be expressed in terms of any additional or alternate geo-spatial coordinate systems apparent to one or skill in the art and appropriate to the region.

Further, data record 200 is not limited to the geo-spatial and relationship data described above for region 202. In additional embodiments, data record 200 may include any additional or alternate information apparent to a person or ordinary skill in the art, including, but not limited to, a postal code associated with region 204, a telephone area code associated with region 204, and geo-spatial data identifying one or more additional or alternate boundaries of region 204.

Referring back to FIG. 1, popularity data 146 of database 144 may include data records describing a "popularity" of electronic content including, e.g., web sites or pages, accessed by users across one or more regions. For example, a data record in popularity data 148 may include indicia of popularity for a web page within a particular region. In an embodiment, the indicia of popularity for the web page may reflect a number of times users have requested the web page within the region, and/or a number of users who have requested the web page within the region, as described below in reference to FIG. 3.

Figure 3:
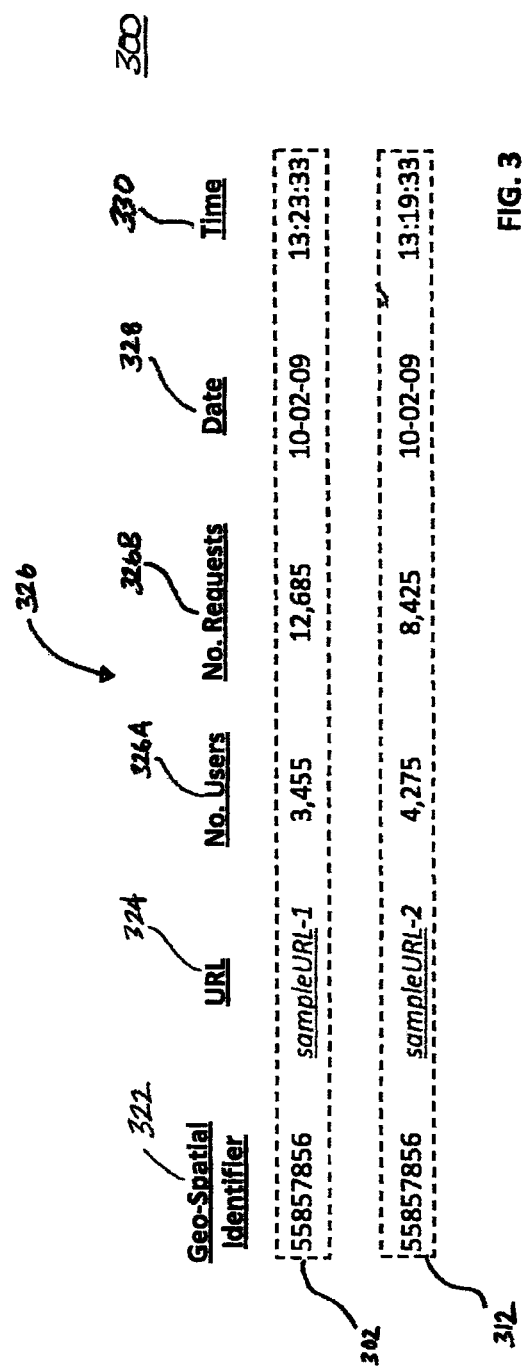

FIG. 3 illustrates exemplary set of data records 300 that may be included within popularity data 148, consistent with disclosed embodiments. In the embodiment of FIG. 2, records 300 include individual data records 302 and 312. However, records 300 are not limited to data records 302 and 312, and in additional embodiments, records 300 may include any number of data records without departing from the spirit or scope of the present invention.

In FIG. 3, data records 302 and 312 respectively include an identifier 322, a Uniform Resource Locator (URL) 324 of a corresponding web page, popularity indicia 326, a date stamp 328, and a time stamp 330. In an embodiment, identifier 322 of data records 302 and 312 may be a geo-spatial identifier. By way of example, identifier 322 may include a unique, numerical identifier of a region, e.g., a WOEID, associated with data records 302 and 312.

Popularity indicia 326 may include a number of users 326A and a number of requests 326B. For example, number of users 326A may reflect a number of users within a region associated with identifier 322 that have requested web page 324, and number of requests 326B may reflect a number of times that web page 324 was requested by users within the region. In an embodiment, number of requests 326B may reflect a summation of "click" events (e.g., when a user clicks on a URL rendered as a link by an application) and "load" events (e.g., when a user types a URL into an address window of an application browser).

However, popularity indicia 326 are not limited to number of users 326A and number of requests 326B. In additional embodiments, popularity indicia 326 may include a combination of a number of requests and a number of requesting users, or any additional or alternate indicia of popularity apparent to a person of skill in the art and appropriate to the web site, without departing from the spirit or scope of the invention.

Date stamp 328 and time stamp 330 may reflect a date and time at which data records 302 or 312 were generated and/or updated. For example, data records 302 and 312 may be updated at periodic intervals, e.g., at one-, five-, or fifteen-minute intervals, may be updated when new data is received, or may be updated according to any additional or alternate scheme apparent to a person of ordinary skill in the art.

For example, record 302 may be associated with identifier "55857856" (which corresponds to the "Crystal City" region described in FIG. 2) and a web page having a URL of "sampleURL-1." Record 302 indicated that 3,455 users requested "sampleURL-1" within Crystal City, and these users requested "sampleURL-1" 12,685 times. Further, record 302 was updated on Feb. 9, 2010 at 13:23:33.

Further, for example, record 312 may be associated with identifier "55857856," which is associated with Crystal City, and may describe a popularity of a web page having URL of "sampleURL-2" within Crystal City. Data record 312 also indicates that 4,275 users requested "sampleURL-2" within Crystal City, and these users requested "sampleURL-2" 8,425 times. Further, data record 312 was updated on Feb. 9, 2010 at 13:19:33.

In an embodiment, a "popularity" of a web site within a geographic region may be quantified according to a number of requesting users, e.g., number of users 326A. In such embodiments, "sampleURL-2," corresponding to data record 312, would be judged more "popular" within Crystal City.

Alternatively, the "popularity" may be quantified based on a number of requests, e.g., number of requests 326B. In such an embodiment, "sampleURL-1," which is associated with data record 302, would be judged more "popular" within Crystal City.

However, as discussed above, the quantification of "popularity" is not limited to the indicia described above. In an embodiment, the "popularity" may be determined based on a combination of a number of requests and number of users, e.g., a weighted average of normalized quantities, and any additional or alternate indicia of popularity apparent to a person of skill in the art.

Referring back to FIG. 1, computing environment 100 also includes web server 130 in communications with client devices 102 and 112, and in communication with recommendation system 140, across communications network 120. For example, web server 130 may deliver electronic content associated with a web page or an electronic resource (e.g., HTML documents, Java scripts, style sheets, digital images, digital video, and digital music associated with a web page) to a client device, e.g., client device 102, in response to a request received from the client device received across network 120.

Further, in an embodiment, web server 130 may operate in conjunction with recommendation system 140 to identify one or more web pages or other electronic content popular with users within a geographic region, and to deliver these URLs associated with these popular web pages or other electronic content to client device 102. For example, in response to a request for a web page, web server 130 may transmit a URL of the requested web page and an identifier of a user, e.g., an IP address of client device 102, to recommendations server 140. Upon receipt, recommendations server 140 may log the received request, identify one or more URLs that are popular within a geographical region associated with the IP address of the client device, and transmit the popular URLs to the web server for delivery to client device 102.

Figure 4:
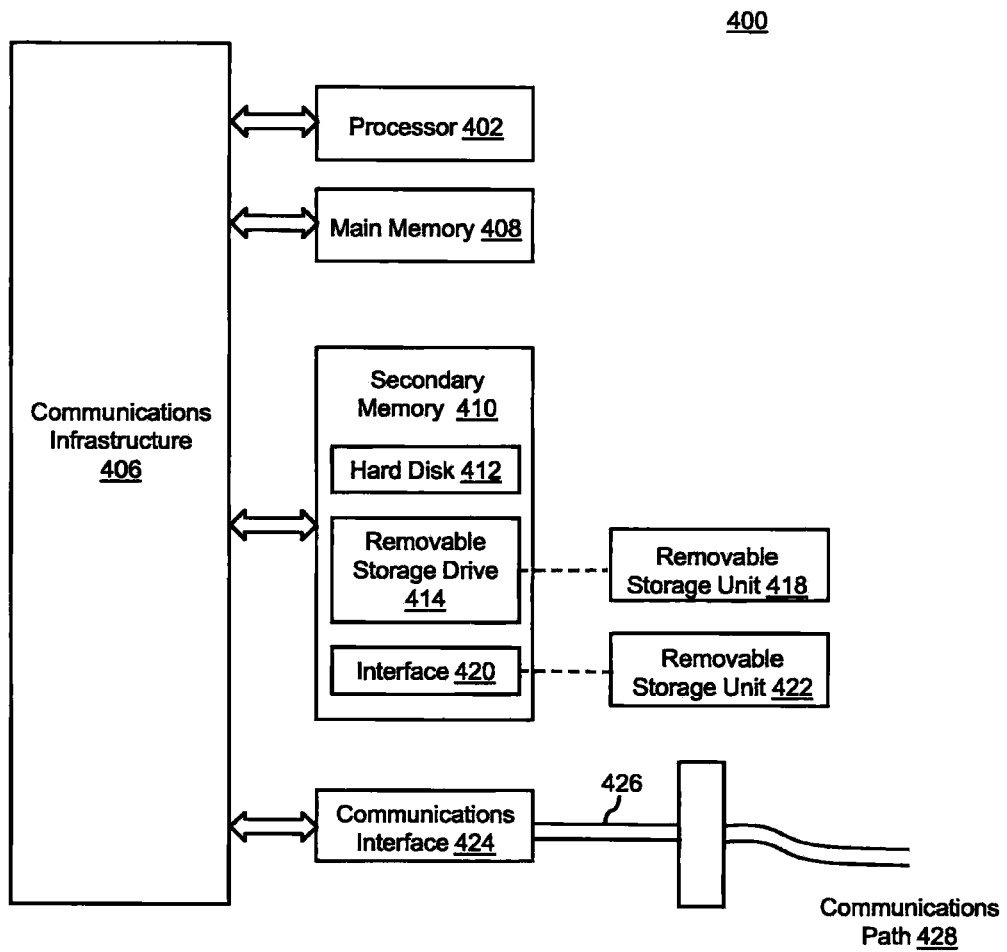
FIG. 4 is a diagram of an exemplary computer system, consistent with embodiments of the invention.

Client devices 102 and 112, web server 130, and recommendation system 140 may represent any type of computer system capable of performing communication protocol processing. FIG. 4 is an exemplary computer system 400, according to an embodiment of the invention. Computer system 400 includes one or more processors, such as processor 402. Processor 402 is connected to a communication infrastructure 2406, such as a bus or network, e.g., network 120 of FIG. 1.

Computer system 400 also includes a main memory 408, for example, random access memory (RAM), and may include a secondary memory 410. Secondary memory 410 may include, for example, a hard disk drive 412 and/or a removable storage drive 414, representing a magnetic tape drive, an optical disk drive, CD/DVD drive, etc. The removable storage drive 414 reads from and/or writes to a removable storage unit 418 in a well-known manner. Removable storage unit 418 represents a magnetic tape, optical disk, or other computer-readable storage medium that is read by and written to by removable storage drive 414. As will be appreciated, the removable storage unit 418 can represent a computer-readable medium having stored therein computer programs, sets of instructions, code, or data to be executed by processor 402.

In alternate embodiments, secondary memory 410 may include other means for allowing computer programs or other program instructions to be loaded into computer system 400. Such means may include, for example, a removable storage unit 422 and an interface 420. An example of such means may include a removable memory chip (e.g., EPROM, RAM, ROM, DRAM, EEPROM, flash memory devices, or other volatile or non-volatile memory devices) and associated socket, or other removable storage units 422 and interfaces 420, which allow instructions and data to be transferred from the removable storage unit 422 to computer system 400.

Computer system 400 may also include one or more communications interfaces, such as communications interface 424. Communications interface 424 allows software and data to be transferred between computer system 400 and external devices. Examples of communications interface 424 may include a modem, a network interface (e.g., an Ethernet card), a communications port, a PCMCIA slot and card, a wireless transmitter or card, etc. Software and data may be transferred via communications interface 424 in the form of signals 426, which may be electronic, electromagnetic, optical or other signals capable of being received by communications interface 224. These signals 426 are provided to communications interface 424 via a communications path (i.e., channel 428). Channel 428 carries signals 426 and may be implemented using wire or cable, fiber optics, an RF link, wireless transmissions, and other communications channels. In an embodiment of the invention, signals 426 comprise data packets sent to processor 402. Information representing processed packets can also be sent in the form of signals 426 from processor 402 through communications path 428.

The terms "storage device" and "storage medium" may refer to particular devices including, but not limited to, main memory 408, secondary memory 410, a hard disk installed in hard disk drive 412, and removable storage units 418 and 422. Further, the term "computer-readable medium" may refer to devices including, but not limited to, a hard disk installed in hard disk drive 412, any combination of main memory 208 and secondary memory 410, and removable storage units 418 and 422, which respectively provide computer programs and/or sets of instructions to processor 402 of computer system 400. Such computer programs and sets of instructions can be stored within one or more computer readable media. Additionally or alternatively, computer programs and sets of instructions may also be received via communications interface 424 and stored on the one or more computer readable media.

Such computer programs and instructions, when executed by processor 402, enable processor 402 to perform one or more of the computer-implemented methods described herein. Examples of program instructions include, for example, machine code, such as that code produced by a compiler, and files containing a high-level code that can be executed by processor 402 using an interpreter.

The computer-implemented methods described herein can also be implemented on a single processor of a computer system, such as processor 402 of system 400. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

As discussed above, web server 130 may receive and service requests for web pages from a user of a client device, e.g., client device 102. In an embodiment, web server 130 may also deliver to client device 102 a set of links to web pages are popular with additional users in a geographic region associated with client device 102. For example, for a user in Washington, D.C., a delivered web page may include links to web pages that have been recently viewed by users in the Washington, D.C. area and that are related to the subject matter of the delivered web page. Further, as discussed above a "popular" web page may be determined based on a number of users that requested the web page within the Washington, D.C. area, a number of times the web page was requested, a combination thereof, and any additional or alternate indicia of popularity apparent to one of skill in the art.

Figure 5:
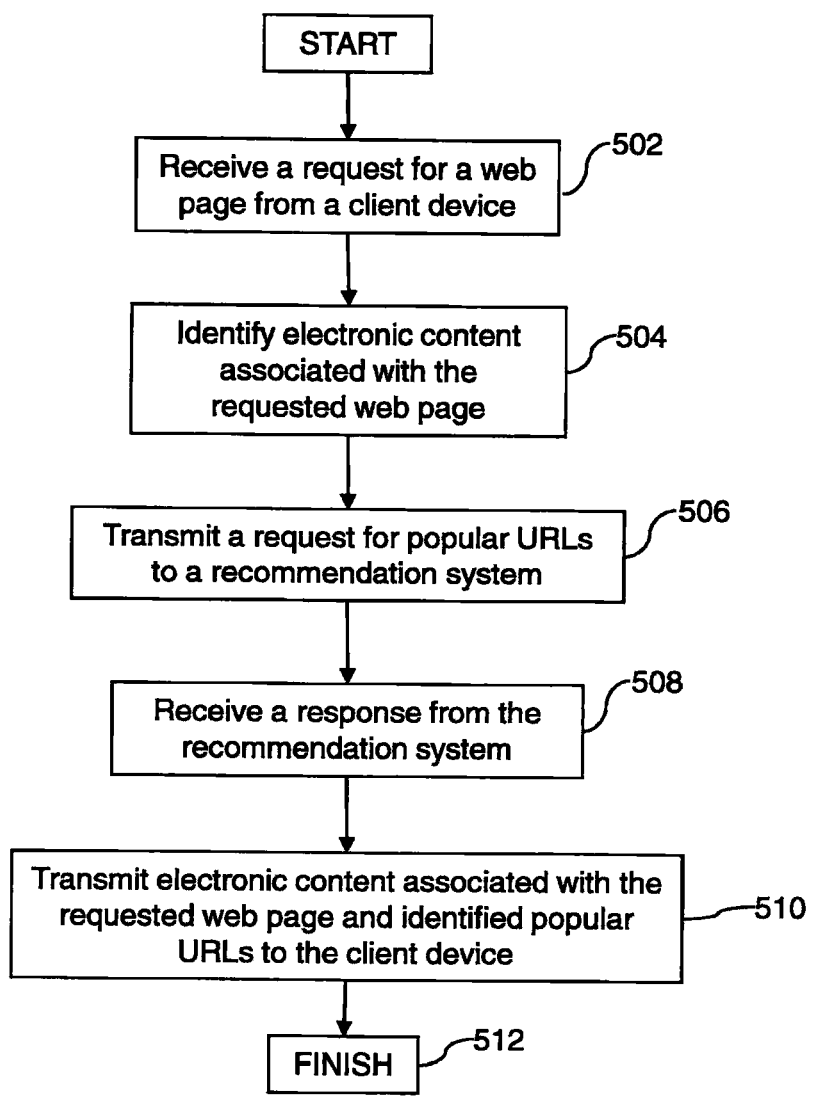
FIG. 5 is a flowchart of an exemplary method for providing recommendations of popular web pages, according to an embodiment of the invention.

FIG. 5 illustrates an exemplary method 500 for providing recommendations of electronic content to a client device, according to a disclosed embodiment. In this exemplary embodiment, the method is described with respect to recommendations of popular web pages. It will be appreciated, however, that the exemplary can be adapted for any type of electronic content, including videos, audio files, images, articles, blogs, or other content accessible over the Internet.

In an embodiment, method 500 provides functionality to enable a web server, e.g., web server 130, to receive a request for a web page from a client device, e.g., client device 102, and to deliver the requested web page and a set of recommended web sites or pages that are popular within a geographic region associated with client device 102.

Referring to FIG. 5, in step 502, a request for a web page is received from client device 102. In an embodiment, the request may include an IP address of client device 102 and a URL of the requested web page. For example, client device 102 may be configured to execute a browser application capable of rendering standard Internet content, such as Netscape Navigator, Microsoft Internet Explorer, and/or Mozilla Firefox. A user of client device 102 may request a particular web page by entering a URL into the browser application, and additionally or alternatively, by selecting a hyperlink displayed by the browser application or by an additional application configured to interface with the browser application (e.g., a word processing program configured to display actionable hyperlinks). The browser application may subsequently transmit the requested URL, and additionally, an IP address of client device 102 to web server 130.

The received request may be processed in step 504 to identify electronic content associated with the requested web page. For example, the identified content may include, but is not limited to, documents in a markup language such as HTML, Java scripts, style sheets, and digital content, such a images, audio, text, and video. In an embodiment, the electronic content may be stored within a memory of web server 130, e.g., memory 408 of FIG. 4.

In step 506, web server 130 may transmit a request for a set of popular URLs a to recommendation system, e.g., recommendation system 140 of FIG. 1. In an embodiment, the set of popular URLs may include those URLs of web sites or pages that are popular within a geographic region associated with client device 102 and that have been accessed within a predetermined time period (e.g., fifteen minutes, 1 hour, 24 hours, etc.) of the request received in step 502. For example, the request for popular URLs may include the IP address of client device 102 and requested URL, as received in step 502.

In an embodiment, recommendation system 140 may process the received IP address and the requested URL to generate and update popularity data associated with the requested URL, e.g., popularity data 148 of database 144. Further, recommendation system 140 may also process the received IP address to identify a region associated with a client device 102, and to identify URLs of web sites or pages that are popular within the region associated with client device 102.

In step 508, a response to the transmitted request is received from recommendation system 140. In an embodiment, web server 130 may process the received response to obtain the set of popular URLs, which, in an embodiment, may be incorporated into the electronic content associated with the requested web page. The requested electronic content, and the set of popular URLs, may be transmitted in step 510 to client device 102 across network 120, using one or more of the communications protocols identified above. In certain embodiments, web server 130 may send a response to client device 102 that includes the requested electronic content and popular URLs in the form of an HTML document or file. The HTML document or file may include instructions that automatically cause a browser of client device 102 to request and retrieve one or more portions of the requested electronic content from other web servers. Following step 510, method 500 ends in step 512.

Figure 6:
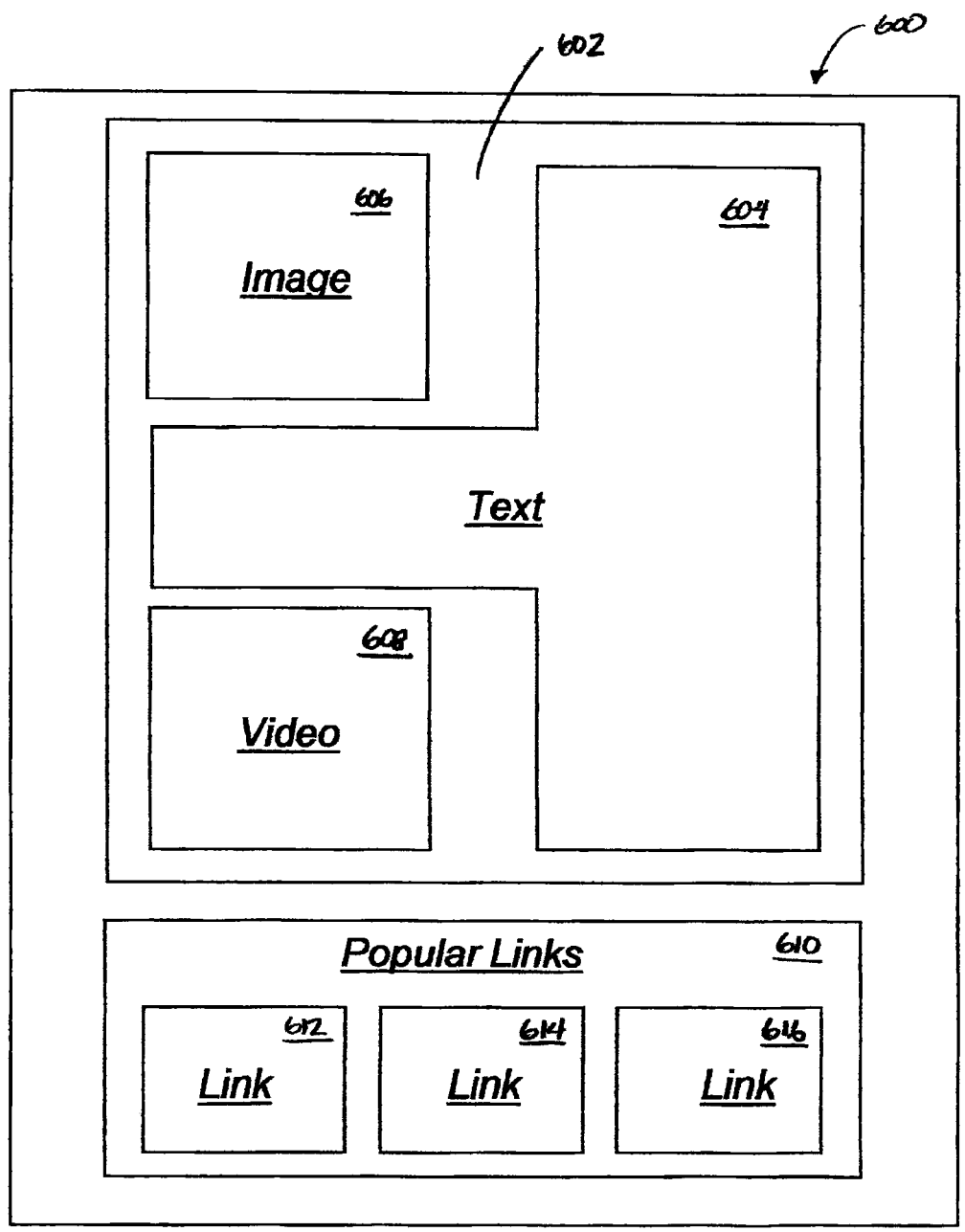
FIG. 6 is a diagram of an exemplary web page that includes links to recommended web pages, consistent with embodiments of the invention.

Upon receipt of the requested electronic content, from web server 130 and/or other web servers (as instructed), the browser application of client device 102 may render the received content and display the rendered content to the user. FIG. 6 illustrates an exemplary web page 600 that includes hyperlinks to one or more popular web pages, according to a disclosed embodiment. In FIG. 6, web page 600 may include rendered electronic content 602 that includes, but is not limited to, rendered text 604, a digital image 606, and a digital video 608. In an embodiment, rendered content 602 may be received from a web server in response to a user's "click" on a hyperlink or a user's entry of a URL in a browser window. Furthermore, although described in terms of text, images, and video, rendered content 602 is not limited to such content, and in additional embodiments, rendered content 602 may include any additional or alternate form of digital media apparent to a person or ordinary skill in the art and appropriate to client device 102.

Web page 600 also includes links 610 to recommended web sites or pages that, in an embodiment, may be popular within a geographic region associated with client device 102. For example, links 610 may represent "Popular Links," and may include respective hyperlinks 612, 614, and 616 to corresponding popular web sites or pages. For example, links 612, 614, and 616 may be associated with subject matter of web page 600, and may be received from web server 130, through an interaction with a recommendation server, as discussed above. Further, although described in terms of three hyperlinks, links 610 may include any additional or alternate number of links to popular URLs without departing from the spirit or scope of the invention.

Figure 7:
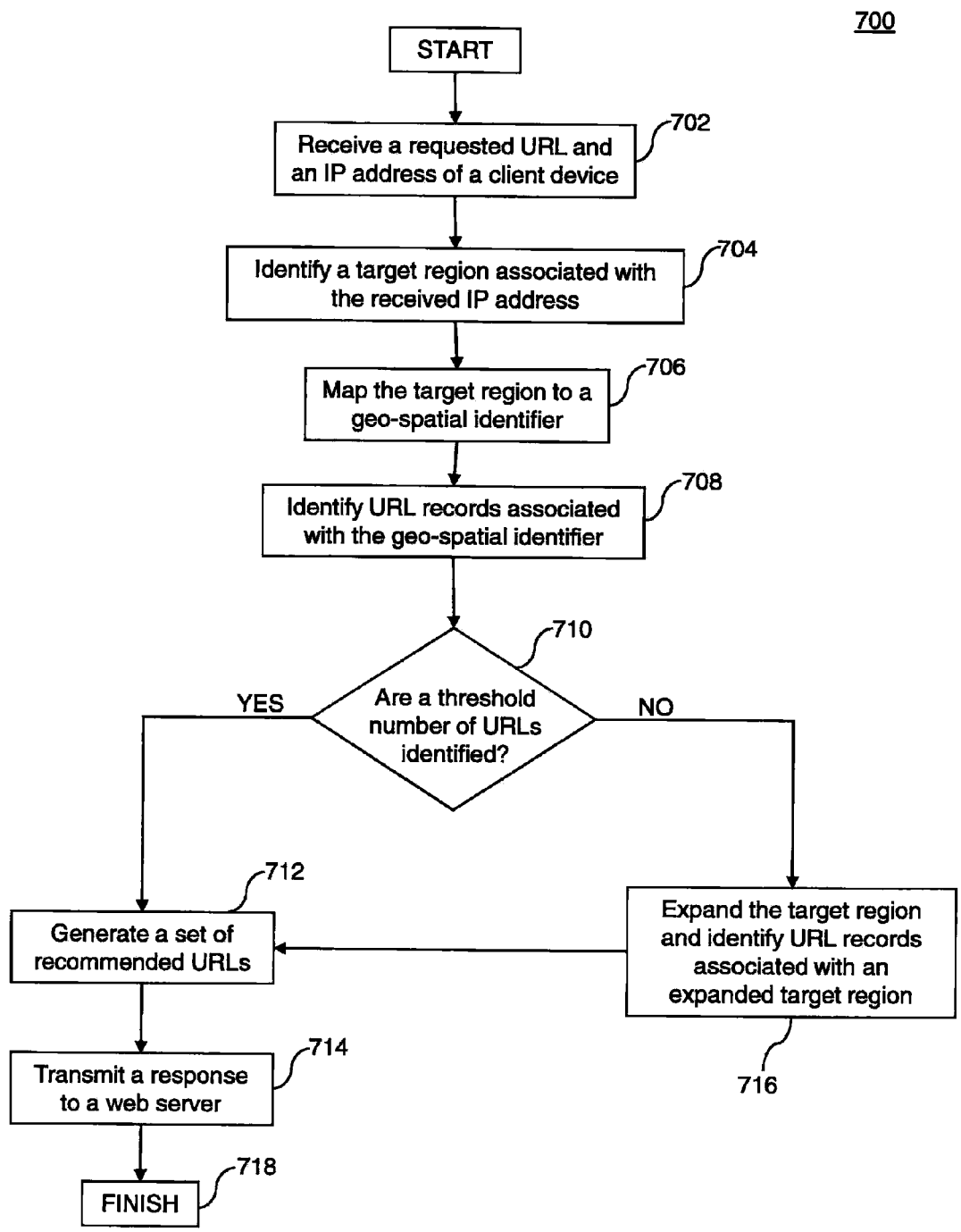
FIG. 7 is a flowchart of an exemplary method for identifying electronic content popular within a region, according to an embodiment of the invention.

FIG. 7 is a flow diagram of an exemplary method 700 for identifying electronic content that is popular within a region, according to an embodiment. For example, method 700 may provide functionality to enable a recommendation system, e.g., recommendation system 140, to identify URLs of web sites or pages popular within a region associated with a client device, e.g., client device 102, and to provide these popular URLs to a web server, e.g., web server 130. Although the exemplary embodiment of FIG. 7 is described with reference to identifying popular web sites or pages, it will be appreciated that the method of FIG. 7 may be adapted for identifying and recommending any type of electronic content (e.g. videos, audio files, text, blogs, etc.).

In step 702, recommendation system 140 receives an IP address associated with client device 102, and a URL of a web page requested by client device 102. In an embodiment, web server 130 may transmit the received IP address and URL to recommendation system 140 in response to a request for the web page from client device 102. For example, web server 130 may be configured to execute a script, e.g., a Java script, that automatically forwards the requested URL and the IP address of the requesting client device to recommendation system 140.

In step 704, the received IP address may be processed to identify a target region (e.g., a geographic region associated with the received IP address). For example, the target region may be a region that includes the client device 102. In an embodiment, the processing in step 804 may incorporate any of a number techniques to identify the target region, including, but not limited to, the use of a "WhoIs" utility and the use of a commercial or proprietary lookup service.

Once the target region is identified, step 706 subsequently identifies a geo-spatial identifier, e.g., a WOEID, associated with the target region. In an embodiment, recommendation system 140 may query a set of geo-spatial data, e.g., location data 146 of database 144, to map the target region to the corresponding geo-spatial identifier and to identify and retrieve a corresponding data record.

A set of popularity data, e.g., popularity data 148 of database 144, may be processed in step 708 to identify each URL record associated with the geo-spatial identifier. For example, each of the identified URL records may include a URL of a web site or page, the geo-spatial identifier associated with the URL, indicia of popularity of the URL within the target region, and a date and time stamp, as discussed above in reference to FIG. 3.

In an embodiment, the URL records identified in step 708 may include URL records that have been updated, or generated, within a predetermined time period of a current time. For example, step 708 may obtain a date and/or time stamp of each URL record associated with the geo-spatial identifiers (e.g., date stamp 328 and time stamp 330 of FIG. 3), and may identify those URL records that have been updated, or generated, within the predetermined time period. In such embodiments, the predetermined time period may represent any suitable length of time (e.g., one minute, five minutes, fifteen minutes, one hour, 12 hours, 24 hours, 1 week, 2 weeks, 1 month, etc) or may be adaptively set according to one or more criteria (e.g., content category, volume of records, geographic location or region, etc).

Step 710 may then determine whether the URL records identified in step 708 include a threshold number of URLs. In an embodiment, the threshold number of URLs may be a predetermined number of URLs, e.g., five URLs, ten URLs, twenty URLs, or any additional or alternate number of URLs. However, in additional embodiments, the threshold number of URLs may be adaptively determined through an application of a statistical model to popularity data 148, or through any additional or alternate technique apparent to one of skill in the art.

If step 710 determines that the identified URL records include the threshold number of URLs, then the identified URL records are processed in step 712 to generate a recommended set of popular URLs. In an embodiment, the recommended set of popular URLs may represent the threshold number of URLs that are most "popular" within the target geographic region. For example, the set of recommended URLs may include those URLs requested at the greatest frequency, and additionally or alternatively, those URLs requested by the greatest number of users.

The set of recommended URLs are subsequently transmitted to web server 130, in step 714 across network 120 using one or more of the communications protocols outlined above. In an embodiment, and as described above in reference to steps 508 and 510 of FIG. 5, web server 120 may incorporate the set of recommended URLs into the requested electronic content and transmit the electronic content to a client device, e.g., client device 102, across network 120. Once transmitted to web server 130 in step 714, method 700 is then completed in step 718.

However, if step 710 determines that the identified URL records do not include the threshold number of URLs, step 716 generates an expanded target region associated the IP address received in step 702, and processes the expanded target region to identify a set of URL records popular within the expanded target region. In an embodiment, the set of URL record popular within the expanded target region includes a number of URLs that is equivalent to, or exceeds, the threshold number.

In an embodiment, the expanded target region generated in step 716 may include one or more additional (or "neighboring") regions that are adjacent to, or that border, the target region associated with the received IP address. For example, such "neighboring" geographic regions may be identified using a data record associated with the geo-spatial identifier of the target region, e.g., data record 200 of FIG. 2.

In an additional embodiment, the expanded target region generated in step 716 may include an additional region that shares a parent region (e.g., one or more of a locality, municipality, county, provide, state, and/or country) with the target region. For example, and as discussed above, the data record associated with the target region may identify one or more parent regions that include the target region and one or more corresponding geo-spatial identifiers associated with the parent regions.

The set of URL records identified in step 716 for the expanded target region are then passed to step 712 to generate the recommended set of popular URLs, which are transmitted to web server 130 in step 714. As discussed above in reference to step 510 of FIG. 5, the set of popular URLs may be transmitted to a client device 102 across network 120. Following step 714, method 700 is subsequently completed in step 718.

Figure 8:
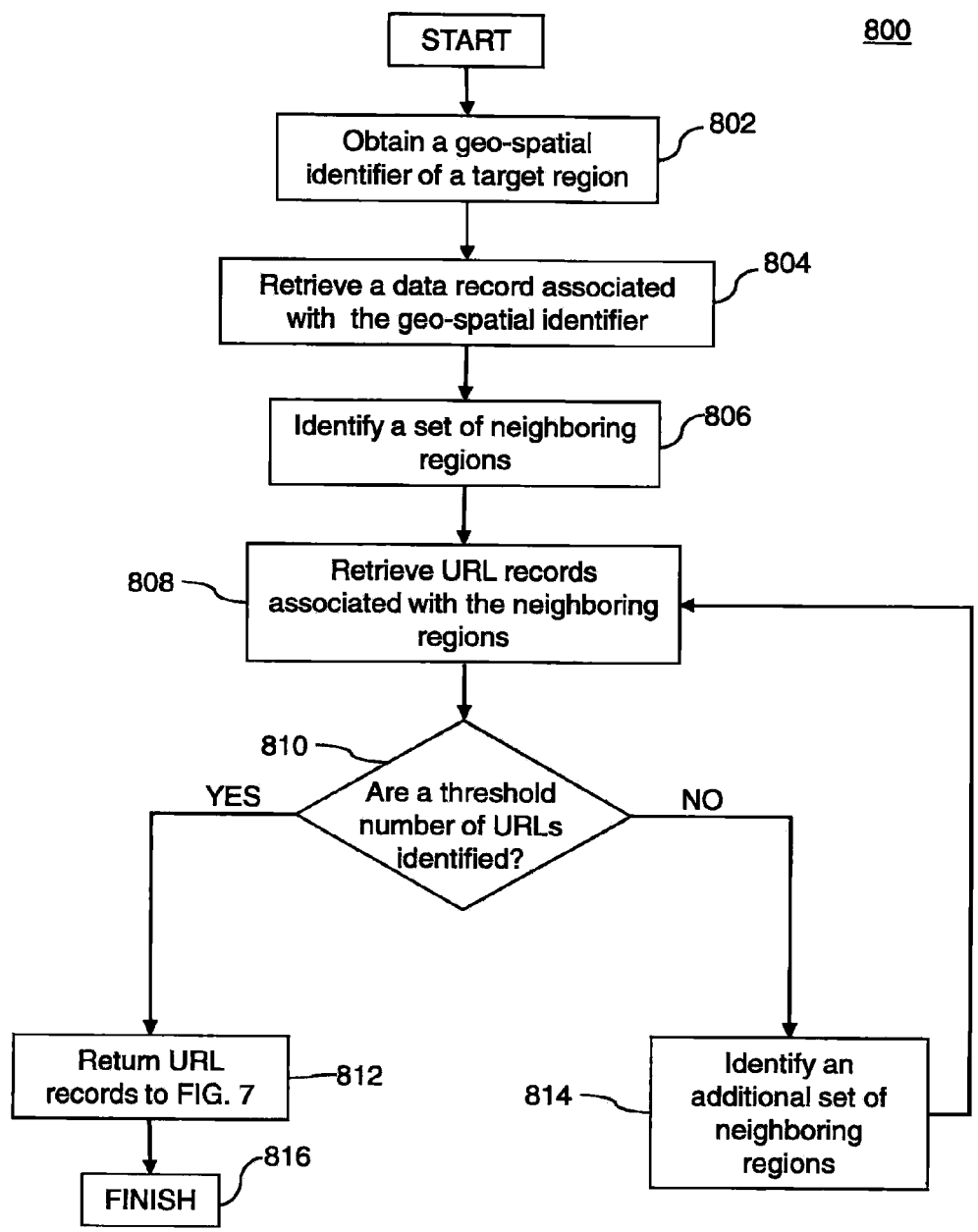
FIG. 8 is a flowchart of an exemplary method for indentifying web pages popular within an expanded region, according to an embodiment of the invention.

FIG. 8 is a flow diagram of an exemplary method 800 for identifying electronic content popular within an expanded target region, according to a disclosed embodiment. For example, method 800 provide functionality to enable a recommendation system, e.g., recommendation system 140, to generate an expanded target region that includes a target region and one or more neighboring regions, and to identify a set of URLs of popular web sites or pages within the expanded target region. In an embodiment, method 800 may be may be incorporated into step 718 of FIG. 7 to identify the set of popular URLs in the expanded target area.

In FIG. 8, a geo-spatial identifier associated with an target region is obtained in step 802. For example, and as discussed above in reference to FIG. 7, the initial target region may represent a geographic region associated with an IP address of a client device, e.g., client device 102, and the geo-spatial identifier may represent a WOEID associated with the initial target region.

Step 804 then retrieves a data record associated with the geo-spatial identifier from a set of geo-spatial data, e.g., location data 146 of database 144. In step 806, the retrieved data record is processed to identify one or more regions (e.g., "neighboring" regions) that are proximate to the target regions. In an embodiment, such neighboring regions may also share a portion of a boundary with the target region.

For example, the data record associated with the initial target region may identify the one or more neighboring regions and corresponding geo-spatial identifiers of the neighboring regions. In such an embodiment, the data record associated with the identifier of the target region may be processed in step 806 to obtain the geo-spatial identifiers of the neighboring regions.

Figure 9A:
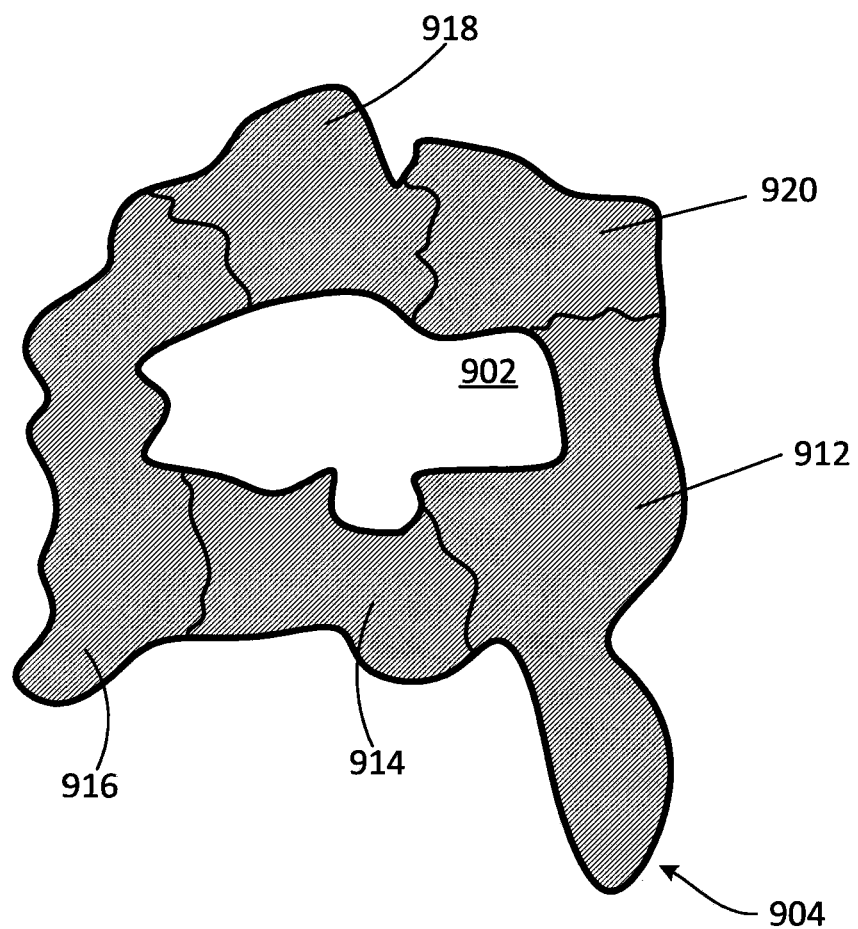
FIGS. 9A and 9B are diagrams of expanded regions, consistent with embodiments of the invention.

In an embodiment, the target region may be expanded to form an expanded target region that includes the one or more neighboring regions and the target region. FIG. 9A illustrates an exemplary expanded target region 900, consistent with disclosed embodiments. In FIG. 9A, an target region 902 may be associated with neighboring regions 912, 914, 916, 918, and 920. For example, neighboring regions 912, 914, 916, 918, and 920 are proximate to target region 902 and share a portion of a boundary with target region 902.

For example neighboring regions 912, 914, 916, 918, and 920, shown in the shaded regions of FIG. 9A, surround target region 902 and form a concentric ring of neighboring regions about target region 902. In such an embodiment, initial target region 902 and neighboring regions 912, 914, 916, 918, and 920 form expanded target region 900 having an outer boundary 904.

Referring back to FIG. 8, step 808 processes a set of popularity data (e.g., popularity data 148 of database 144) to retrieve each URL record associated with the geo-spatial identifiers of the neighboring regions (e.g., neighboring regions 912, 914, 916, 918, and 920 of FIG. 9A). As discussed above, each of the identified URL records may include a URL, a geo-spatial identifier, indicia of popularity of the URL within a region associated with the geo-spatial identifier, and a date and time stamp identifying a date and time at which the record was generated and/or updated.

Further, in an embodiment, the URL records retrieved in step 808 may include URL records that have been updated, or generated, within a predetermined time period of a current time. For example, step 808 may obtain a date and/or time stamp of each URL record associated with the geo-spatial identifiers, and may retrieve those URL records that have been updated, or generated, within the predetermined time period. In such embodiments, the predetermined time period may represent any suitable length of time (e.g., one minute, five minutes, fifteen minutes, one hour, 12 hours, 24 hours, 1 week, 2 weeks, 1 month, etc.), or may be adaptively set according to one or more criteria (e.g., content category, volume of records, geographic location or region, etc).

Step 810 then determines whether the URL records of the expanded target region (i.e., the URL records of the neighboring regions and the initial target geographic region) include a threshold number of URLs. As discussed above, the threshold number of URLs may be a predetermined number, e.g., five URLs, ten URLs, twenty URLs, any additional or alternate number of URLs, or any adaptively-determined number of URLs, without departing from the spirit or scope of the invention.

If it is determined in step 810 that the URL records associated with the expanded target region include at least the threshold number of URLs, then in step 812 the URL records are passed back to step 712 of FIG. 7 for additional processing, and method 800 is then completed in step 816. However, if the URL records associated with the expanded target region fail to include the threshold number of URLs, then in step 814 the expanded target region is extended to include an additional set of neighboring regions.

In an embodiment, step 814 may query a set of geo-spatial data (e.g., location data 146 of database 144) to identify and retrieve data records corresponding to each of the neighboring regions identified in step 808. The data records retrieved in step 814 may then be processed to identify the additional set of neighboring regions and geo-spatial identifiers corresponding to the additional set of neighboring regions. For example, the additional neighboring regions identified in step 814 may be proximate to and share a boundary with the neighboring geographic regions identified in step 806, as further described below in reference to FIG. 9B.

Figure 9B:
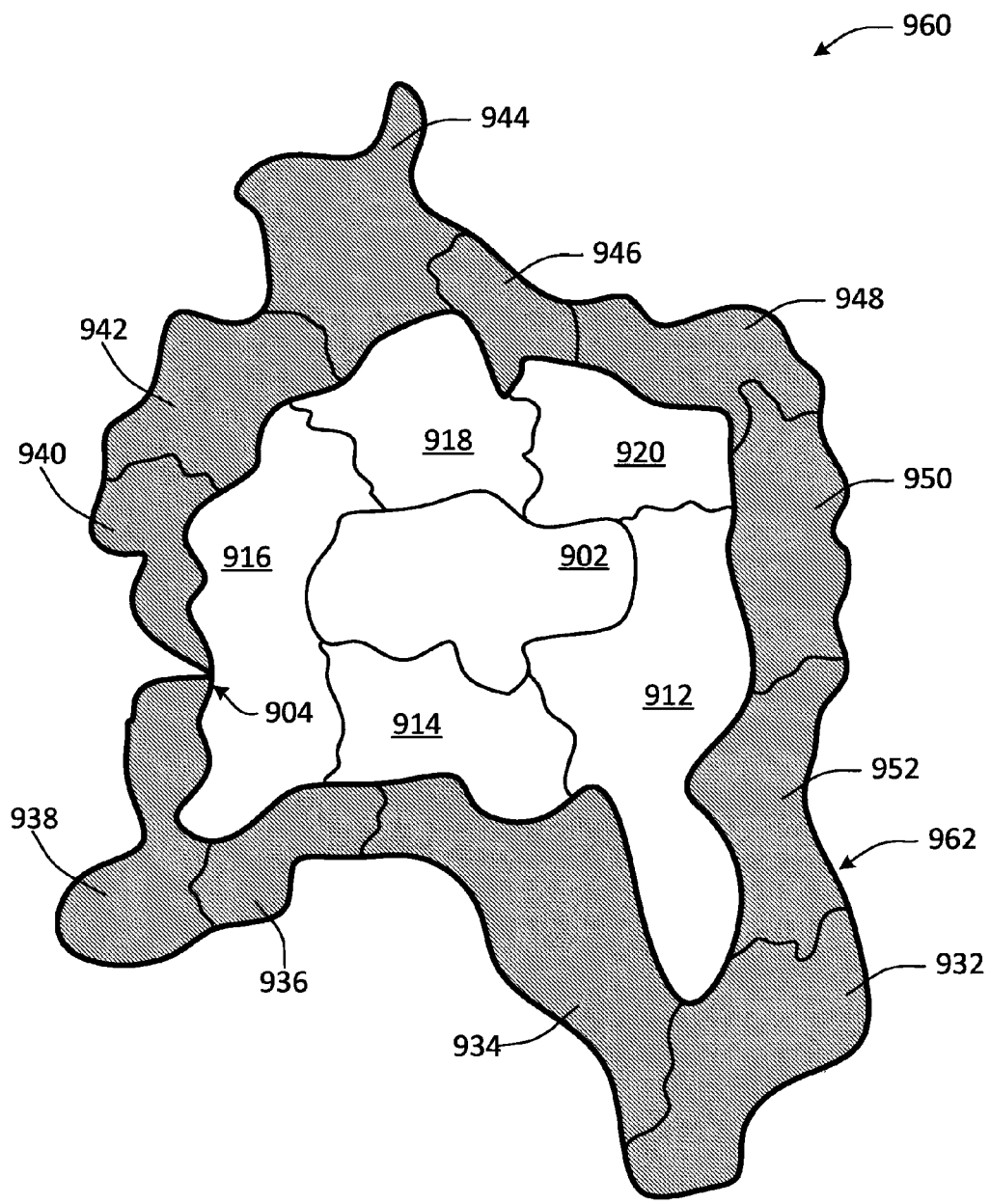

FIG. 9B illustrates an exemplary extended target region 960, consistent with disclosed embodiments. Extended target region 960 may represent an extension of expanded target region 900 to include an additional set of neighboring regions, as depicted in the shaded regions of FIG. 9B. For example, the additional set of neighboring regions may be disposed between boundary 904 (e.g., the boundary of expanded target region 900 of FIG. 9A) and boundary 962.

In accordance with the disclosed embodiments, the additional set of neighboring regions may be proximate to and/or share a boundary with the initial set of neighboring regions, e.g. regions 912, 914, 916, 918, and 920. For example, region 912 may be associated with additional neighboring regions 932, 934, 950, and 952, and region 918 may be associated with additional neighboring regions 942, 944, and 946. In such embodiments, the set of additional neighboring regions represent a concentric ring or area of regions disposed about a previously-expanded target region (e.g., region 900 of FIG. 9A) to form extended target region 960.

Referring back to FIG. 8, the geo-spatial identifiers of the additional set of neighboring regions are passed back to step 808, which retrieves a set of URL records associated with the additional set of neighboring regions. Step 810 subsequently determines whether the set of URL records associated with the extended target region (i.e., the URL records of additional set of neighboring regions, combined with the URL records associated with the previously-expanded target region) include at least the threshold number of URLs, as discussed above.

In the embodiments described above, the target region associated with the client device, e.g., client device 102, is expanded incrementally to include concentric rings or areas of neighboring geographic regions. In such embodiments, an effective radius and a perimeter of the target region increase with each incremental expansion, and each expansion step adds additional users associated with the rings of neighboring regions.

However, the expansion processes outlined above are not limited to such incremental expansions. In an additional embodiment, steps 806 and 814 of FIG. 8 may identify a single neighboring region, or alternatively, any subset of neighboring regions associated with the target region, and may generate the expanded and extended target regions based on the identified single neighboring region or subset of neighboring regions. In such embodiments, the expansion processes of FIG. 8 proceed in a limited fashion by adding a relatively small number of users to the target region in each expansion step.

Furthermore, the expansion of the target region is not limited to the addition of more or more neighboring geographic regions that share common boundaries with a target region, are proximate to the target region, and/or include user populations that a demographically similar to that of the target region. In additional embodiments, the target geographic region may be expanded to incorporate one or more additional regions associated with a parent of the target region, as described below in reference to FIG. 10.

Figure 10:
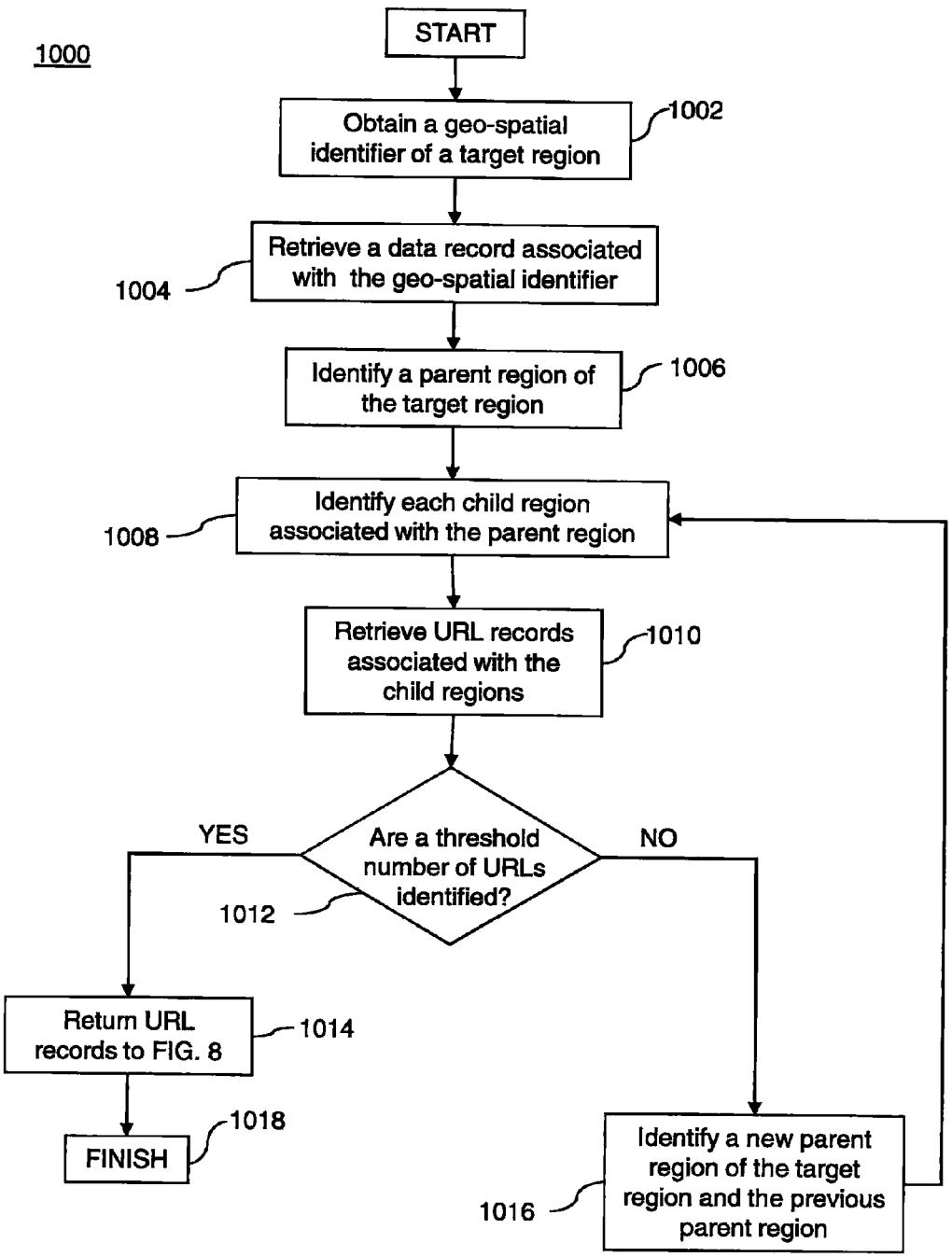
FIG. 10 is a flowchart of an exemplary method for indentifying web pages popular within an expanded region, according to an additional embodiment of the invention.

FIG. 10 is a flow diagram of an exemplary method 1000 for identifying electronic content popular within an expanded target region, according to an additional disclosed embodiment. For example, method 1000 provide functionality to enable a recommendation system, e.g., recommendation system 140, to generate an expanded target region that includes a target region and one or more regions associated with a parent of the target region, and to identify a set of URLs of popular web sites or pages within the expanded target region. In an embodiment, method 1000 may be may be incorporated into step 718 of FIG. 7 to identify the set of popular URLs in the expanded target area.

In FIG. 10, a geo-spatial identifier associated with the initial target geographical region is obtained in step 1002. For example, and as discussed above in reference to FIG. 8, the initial target region may represent a geographic region associated with an IP address of a client device, e.g., client device 102, and the geo-spatial identifier may represent a WOEID associated with the initial target region.

A data record associated with the geo-spatial identifier is retrieved in step 1004 from a set of geo-spatial data, e.g., location data 146 of database 144. In step 1006, the retrieved data record is processed to identify a parent geographical region to which the target geographic region belongs, and a corresponding geo-spatial identifier of that parent region. For example, if the target geographical region is associated with a particular neighborhood, then the immediate parent of that target geographic region may be a municipality or locality.

In step 1008, the geo-spatial identifier associated with the parent region is processed to identify geo-spatial identifiers of each region included within the parent geographic region (e.g., each "child" region). A set of popularity data, e.g., popularity data 148 of database 144, is then processed in step 1010 to identify the URL records associated with the child regions. As discussed above, each of the identified URL records may include a URL, the geo-spatial identifier associated with the URL, indicia of popularity of the URL within the geographical region associated with the geo-spatial identifier, and a date and time stamp.

In an embodiment, the URL records retrieved in step 1010 may include URL records that have been updated, or generated, within a predetermined time period of a current time. For example, step 1010 may obtain a date and/or time stamp of each URL record associated with the geo-spatial identifiers, and may retrieve those URL records that have been updated, or generated, within the predetermined time period. As noted above, the predetermined time period may represent any suitable length of time (e.g., one minute, five minutes, fifteen minutes, one hour, 12 hours, 24 hours, 1 week, 2 weeks, 1 month, etc.), or may be adaptively set according to one or more criteria (e.g., content category, volume of records, geographic location or region, etc).

Step 1012 then determines whether the URL records associated with the parent geographic region (i.e., the URL records associated with the child regions) collectively include a threshold number of URLs. As discussed above, the threshold number of URLs may be a predetermined number, e.g., five URLs, ten URLs, twenty URLs, any additional or alternate number of URLs, an adaptively-determined number of URLs, e.g., through an application of an appropriate statistical model to popularity data 148, and/or through any additional or alternate technique apparent to one of skill in the art.

If it is determined in step 1012 that the URL records associated with the parent region include the threshold number of URLs, then in step 1014 the identified URL records are passed back to step 712 of FIG. 7 for additional processing, and method 900 is then completed in step 1018.

However, if step 1012 determines that the parent region is not associated with the threshold number of records, then the data record associated with the parent region is processed in step 1016 to identify a new parent region and a geo-spatial identifier associated with the new parent region. For example, if the parent geographic region represents a municipality that includes the initial target region, the new parent region identified in step 1016 may represent a county that includes the municipality.

The geo-spatial identifier of the new parent region is then passed back to step 1008, which identifies the child regions associated with the new parent region. For example, if the new parent region is a county, then step 1008 may identify geo-spatial identifiers associated with each region included within the county. The geo-spatial identifiers of the child regions would subsequently be processed in step 1010 to identify URL records associated with the child regions, as outlined above.

Figure 11A:
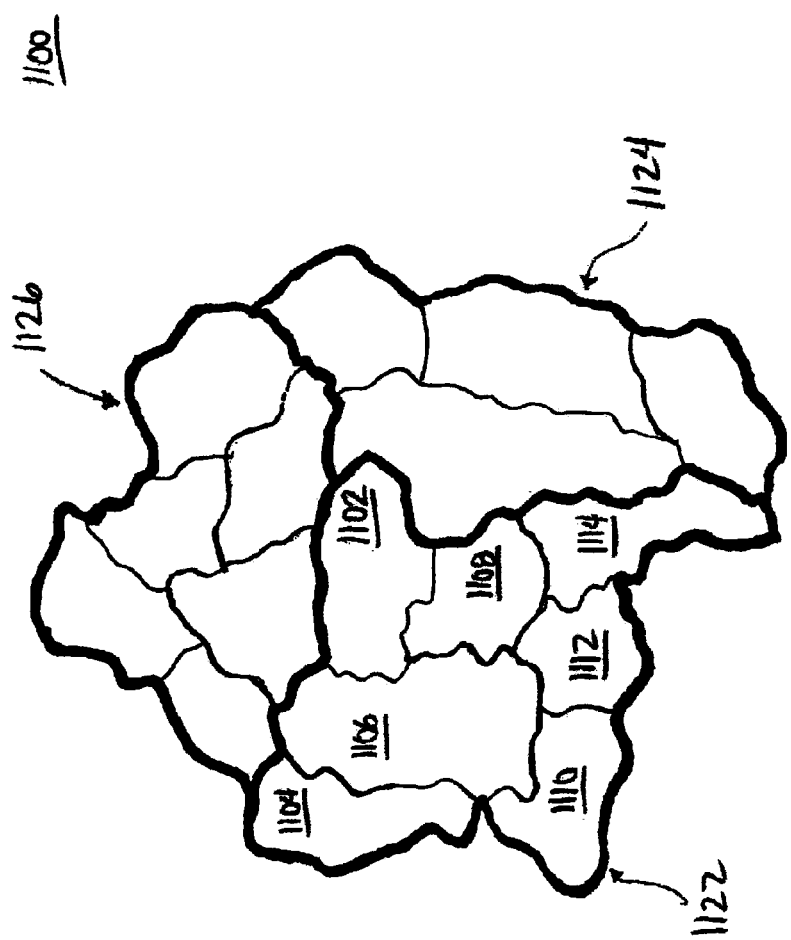

In contrast to the embodiments of FIG. 8, the expansion of the initial target region described in reference to the embodiment of FIG. 10 proceeds through an addition of regions associated with a parent of the initial target region, as illustrated for example in FIGS. 11A and 11B. Specifically, FIG. 11A illustrates an exemplary geographic area 1100 that includes municipalities 1122, 1124, and 1126. In FIG. 11A, municipality 1122 includes an initial target region 1102, and additional regions 1104, 1106, 1108, 1110, 1112, and 1114. In such embodiments, municipality 1122 is a parent region, and regions 1102-1114 represent child regions of that parent region. Further, as municipalities 1122 and 1124 may be included within a corresponding county (not shown), municipalities 1122 and 1124 may be child regions of the corresponding parent county.

As described above in reference to steps 1006 and 1008 of FIG. 10, target region 1102 may be expanded to include child regions associated with a parent of target region 1102. For example, step 1006 may identify that municipality 1122 is the parent region of target region 1102, and that regions 1104-1114 represent additional child regions of municipality 1122. In such embodiments, the expanded target region may include the child regions of municipality 1122, e.g., regions 1102-1114.

Further, as described above in reference to step 1016, a new parent region may be identified and the target region may be further extended to include additional child regions associated with the new parent region. For example, municipality 1122, and municipality 1124, may be included within a corresponding county (not shown), and step 1016 may identify the county as the new parent region. In such embodiments, an extended geographic region 1140 may include each child region of the county, e.g., regions 1102-1114 of municipality 1122, and the regions included within municipality 1124, as shown in the shaded regions of FIG. 11B.

In the embodiments of FIGS. 8 and 10, a target region is expanded on a region-by-region basis (e.g., through neighboring regions or similar child regions) to generate an expanded target region or an extended geographic region. In such embodiments, an expansion step is triggered when a target region does not include a threshold number of URLs. However, the expansion processes described herein are not limited to threshold numbers of URLs, and in additional embodiments, an expansion step may be triggered when the target region does not include a threshold number of users. The threshold number of users may be a predetermined value, e.g., 10,000 users, or may be adaptively-determined based on conditions within a particular target region.

In such embodiments, the exemplary processes of FIGS. 8 and 10 may identify, from an appropriate data record (e.g., location data 146 of database 144), a number of users within the target region. If the number of users were to fall below the threshold number, then the processes of FIGS. 8 and 10 may expand the target region to include addition regions (e.g., neighboring regions or similar child regions) until a number of users in the expanded target region exceeds the threshold value.

In additional embodiments, the processes of FIGS. 8 and 10 may employ a hybrid criteria for triggering an expansion of a target region. For example, the processes of FIGS. 8 and 10 may first employ a threshold for expansion based on a number of users within the target region, and once this population-based threshold is satisfied, revert to a URL-based threshold, as discussed above in reference to FIGS. 8 and 10. The incorporation of such a hybrid threshold criteria may provide recommendations of URLs that are popular within a target region that includes a large number of active users.

Furthermore, the expansion processes of FIGS. 8 and 10 may be subject to population based limitations, or alternatively, geo-spatial limitations. For example, a termination criteria may be imposed on an expansion process, e.g., step 814 of FIG. 8 and step 1016 of FIG. 10, that cuts off expansion when more than a specific number of users have been added to the target region, or that cuts off expansion when the target region crosses a set of geo-spatial bounds, e.g., expressed in terms of latitude and longitude pairs, or any additional or alternate geo-spatial coordinate system. Furthermore, such a termination criteria may leverage any additional or alternate quantity apparent to one or skill in the art and relevant to the target region of interest.

Figure 12:
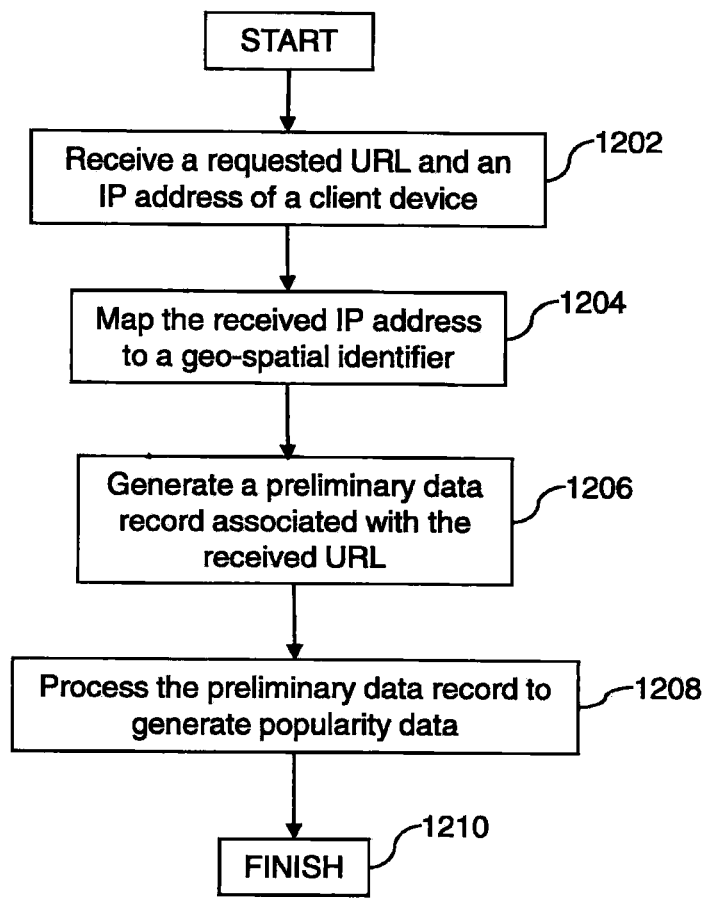
FIG. 12 is a flowchart of an exemplary method for generating and updating popularity data, according to an embodiment of the invention.

As discussed above, a recommendation system, e.g., recommendation system 140, may process a received IP address and a requested URL to generate and update data records within popularity data, e.g., popularity data 148 of FIG. 1. FIG. 12 illustrates an exemplary method 1200 for generating and updating information identifying popular electronic content within a geographic region, according to a disclosed embodiment. For example, method 1200 may provide functionality to enable recommendation system 140 to generate and update data records within popularity data 148 of database 144.

Step 1202 receives an IP address associated with a client device, e.g., client device 102, and a URL of a web site or page (or other electronic content) requested by that client device. In an embodiment, a web server, e.g., web server 130, may transmit the received IP address and URL to recommendation system 140 in response to a request for the web page from client device 102.

In step 1204, the received IP address is mapped to a region and corresponding geo-spatial identifier. In an embodiment, recommendation system 140 may process the received IP address to identify the region associated with the IP address. For example, the region associated with the IP address may be determined using any of a number of techniques apparent to one of skill in the art, including, but not limited to, the use of a "WhoIs" utility and the use of a commercial or proprietary lookup service. Once the region is identified, recommendation system 140 may query a set of geo-spatial data, e.g., the location data 146 of database 144, to map the region to the corresponding identifier, e.g., a WOEID.

A preliminary data record including at least the identifier and the requested URL is generated in step 1206, and the preliminary data record may be stored within a database of popular URLs, e.g., popularity data 148 of database 144. In an embodiment, the preliminary data record may include a user identifier, an identifier associated with a geographic region, and a requested URL, as described below in reference to FIG. 13.

Figure 13:
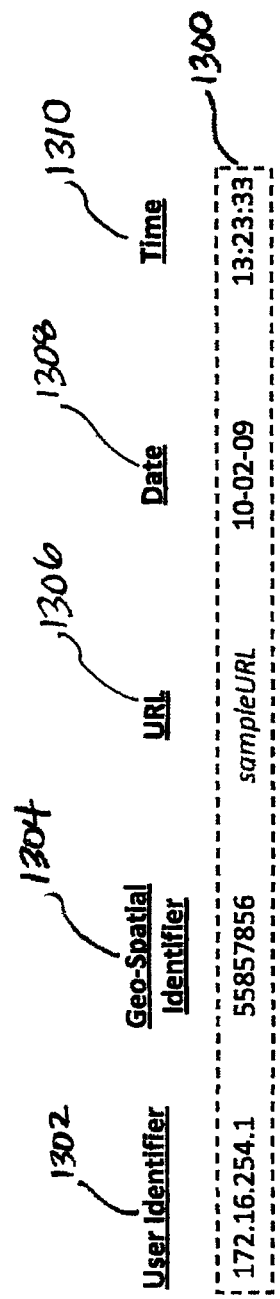
FIG. 13 is a diagram of an exemplary preliminary data record, consistent with disclosed embodiments.

FIG. 13 illustrates an exemplary preliminary data record 1300, consistent with disclosed embodiments. In FIG. 13, preliminary data record 1300 may include a user identifier 1302, a geo-spatial identifier 1304, and a URL 1306. In an embodiment, user identifier 1302 may include an IP address of the requesting client device (e.g., "172.16.254.1") and URL 1306 may include a requested URL (e.g., "sampleURL"), as received in step 1202 of FIG. 12. Further, geo-spatial identifier 804 (e.g., "55857856") may be associated with a region that includes the requesting client device, as determined in step 1204 of FIG. 12. Preliminary data record 1300 may also include a date stamp 1308 and a corresponding time stamp 1310 that indicates respective dates and times at which preliminary data record 1300 was generated.

Referring back to FIG. 12, step 1208 then processes the preliminary data record to generate and/or update one or more data records within the popularity database. In an embodiment, the new or updated data record may have a format consistent with exemplary data record 300 of FIG. 3.

For example, if a data record corresponding to the requested URL and geographic region does not exist within the popularity database, then step 1208 may generate a new data record based on the preliminary data record. However, if a data record associated with the URL and geographic region does exist, then step 1208 updates the popularity indicia to reflect the preliminary data record. In such embodiments, step 1208 may increment the number of times the URL has been requested to account for the preliminary data record, and may increment the number of users that have requested the URL if the user associated with the user identifier (e.g., identifier 802 of FIG. 8) represents a new user.

In an embodiment, step 1208 may immediately generate and/or update data records upon the generation of the preliminary data record in step 1206. However, in additional embodiments, the processing in step 1208 may proceed at periodic intervals, including, but not limited to, a one-minute interval, a five-minute interval, a fifteen-minute interval, or any additional or alternate interval apparent to a person of ordinary skill in the art. In such embodiments, a delay may exist between the generation of the preliminary data record and generation and/or updating of the data records in step 1208, thereby allowing for a bulk generation and/or updating in step 1208 that accounts for multiple preliminary data records. Once the generation and/or updating process is completed in step 1208, method 1200 is complete in step 1210.

In the embodiments described herein, a web server receives a request from a client device for a particular web page, and subsequently interacts with a recommendation system to identify a set of popular URLs that are of geographic and temporal relevance to a user of the client device. In such embodiments, the web server may provide the set of recommended URLs to the client device in conjunction with the requested web page. A browser application executing at the client device may render the received electronic content and display the requested web page and the set of popular URLs to the user.

In yet additional embodiments, the web server may be associated with an online retailer, search engine, or content provider that services requests for electronic content from users over a wide geographic area. For example, the web server may interact with users of client devices to deliver responses to search requests and/or deliver digital music, digital and/or streaming video, electronic books, and any additional or alternate electronic content in response to requests submitted through a web page accessible to the client device. In such embodiments, the web server may provide, to the client device, recommendations of electronic content that are popular within a geographic region of the user at the time of the submitted request.

For example, if the user of the client device requests a web site that delivers digital music, the web service may provide the user a set of popular artists within the user's geographic area and/or a set of popular songs downloaded by other users in the user's geographic area. Similarly, the web server may be associated with a provider of digital movies and/or streaming video content. In such embodiments, the web server may provide the user of the client device with a set of recommended digital movies that have been recently requested by other users within the user's geographical area.

The web server may also be associated with a search engine or module configured to receive and service search queries from client devices over a wide geographic area. In such embodiments, the web server may receive a query from the user of the client device, and may identify or provide electronic content to the client device that is associated with the received query, and that has been recently requested or delivered to other users within the user's geographical area. Further, in additional embodiments, the web server may interact with the recommendation system to identify popular search queries within the user's geographic region, and identify or provide the popular search queries to the client device in conjunction with the search results.

Furthermore, the web server may be associated with a web page that provides a user with electronic advertisements relevant across a variety of geographic regions. For example, the web server may provide a user with a advertisements for new and used vehicles (e.g., the web page may represent electronic classified ads for new and used vehicles). In such embodiments, the disclosed processes may allow the web server to identify and provide to the user advertisements have been recently viewed by other users within the user's geographic region.

As will be appreciated, the embodiments described herein are not limited to recommendations of popular electronic content by online retailers or service providers. In additional embodiments, the web server may be associated with an online news organization, e.g., a web site associated with a newspaper or a cable news network. In such embodiments, the processes described herein may provide to a user a list links to popular articles within the user's geographic region.

News organizations may also provide electronic content of particular interest to a local audience (e.g., a "Metro" section of a newspaper), while simultaneously providing content that may be of interest to a broader national or international audience. In such embodiments, the news organization may provide a "local" web page to users within a specific geographic area, and a "national" web page to users outside of that specific geographic area. Such "local" web pages highlight electronic content of a local interest (e.g., local government news within the specific geographic area) that may be absent from the "national" page.

The embodiments described herein may allow a provider of electronic content, e.g., a news organization, to customize delivered web pages based on a geographic region of a requesting user. In an embodiment, the news organization may deliver a "local" version of a web page to the requesting user automatically based on the user's location without any need for pre-registration. Further, the embodiments described herein may allow the news organization to dynamically arrange the "local" web page to include a fixed number of links to articles of general interest, and to include popular links to news stories of local interest within the user's geographic area.

Furthermore, in additional embodiments, the disclosed embodiments may allow a web server associated with social networking, blogging, or micro-blogging websites (e.g., Facebook, Twitter, Blogger.com) to recommend popular electronic content based on a location of a user. For example, the web server may recommend various types of electronic contents such as a set of popular blogs, threads, and/or postings on the Internet that are popular within a user's geographic area and that have been recently accessed by additional users within that area.

However, the disclosed embodiments are not limited to providers of electronic content, advertisements, and information, and to social networking, blogging, and micro-blogging websites. In additional embodiments, the processes described herein may be applied to web servers that provide any additional or alternate electronic content and/or services apparent to a person or ordinary skill in the art to users across one or more disparate geographical regions. In such embodiments, the web server may provide users with recommended electronic content and/or links to electronic content that may be of both geographic relevance and temporal relevance to the users.

Various embodiments have been described herein with reference to the accompanying drawings. It will, however, be evident that various modifications and changes may be made thereto, and additional embodiments may be implemented, without departing from the scope of the invention as set forth in the claims that follow.

Further, other embodiments will be apparent to those skilled in the art from consideration of the specification and practice of one or more embodiments of the invention disclosed herein. It is intended, therefore, that this disclosure and the embodiments herein be considered as exemplary only, with a true scope and spirit of the invention being indicated by the following listing of exemplary claims.

The invention claimed is:

1. A computer-implemented method for identifying popular electronic content, the method comprising the following operations, performed by one or more processors:
   obtaining geographic data for a first geographic region associated with a client device, the geographic data comprising:
      a geo-spatial identifier associated with the first geographic region; and
      information identifying one or more second geographic regions and relationships between the first geographic region and corresponding ones of the second geographic region, wherein the one or more second geographic regions comprise a child geographic region associated with a parent of the first geographic region;
   retrieving, from a database, first data records associated with the geo-spatial identifier, wherein:
      the first data records comprise one or more of (i) a number of requests for electronic content and (ii) a number of users that requested the electronic content within the first geographic region;
   selecting, when the first data records fail to include a threshold number of data records, at least one of the second geographic regions from the geographic data based on the information identifying the relationships, wherein the method further comprises:
identifying the parent geographic region based on at least the geo-spatial identifier of the first geographic region and the information identifying the relationships;
obtaining a geo-spatial identifier associated with the parent geographic region; and
identifying the child geographic region within geographic data associated with the parent geographic region based on at least the geo-spatial identifier of the parent geographic region and information identifying a corresponding relationship;
generating an expanded geographic region comprising the first geographic region and the at least one second geographic region, the expanded geographic region being associated with second data records, the second data records comprising the first data records and additional data records associated with the at least one second geographic region, wherein the method further comprises:
obtaining geo-spatial identifiers associated with the expanded geographic region; and
retrieving, from the database, the second data records associated with the geo-spatial identifiers of the expanded geographic region;
determining whether the second data records include the threshold number of data records; and
processing the second data records to identify popular electronic content within the expanded geographic region, when the second data records include the threshold number of data records, the popular electronic content being identified based on at least one of the number of requests or the number of users.

2. The method of claim 1, wherein the identified popular electronic content comprises one or more web pages, and wherein the method further comprises delivering, to a server, URLs for the identified popular web pages so that the URLs may be communicated to the client device.

3. The method of claim 1, wherein the second geographic regions comprise a neighboring geographic region.

4. The method of claim 3, wherein the neighboring geographic region is proximate to the first geographic region and shares at least a portion of a boundary with the first geographic region.

5. The method of claim 3, wherein the selecting step comprises:
identifying the neighboring geographic region within the geographic data based on the geo-spatial identifier of the first geographic data and the information identifying the relationships.

6. The method of claim 1, further comprises:
receiving, from a server, a device identifier of the client device and a URL of a requested electronic resource;
generating a preliminary data record based on a least the received device identifier and URL; and
updating the database based on the preliminary data record.

7. The method of claim 1, wherein the retrieving step comprises:
identifying, from the database, the first data records that have been generated or updated within a predetermined period of time.

8. The method of claim 7, wherein the each of the first data records includes information specifying a time when the data record was generated or last updated.

9. A computer-implemented method for identifying popular electronic content, the method comprising the following operations performed by one or more processors:
transmitting, to a server, an identifier of a client device associated with a first geographic region;
receiving, from the server, the identification of popular electronic content associated with an expanded geographic region, the popular electronic content being identified based on first data records comprising at least one of (i) a number of requests for the popular electronic content or (ii) a number of users that requested the popular electronic content within the first geographic region, and the expanded geographic region including the first geographic region associated with the client device and at least one second geographic region;
providing an identification of the popular electronic content to the client device so that the popular electronic content can be communicated to a user, wherein:
the server obtains geographic data for the first geographic region, the geographic data comprising a geo-spatial identifier associated with the first geographic region and information identifying the second geographic region and relationships between the first geographic region and corresponding ones of the second geographic region, wherein the second geographic region comprises a child geographic region associated with a parent of the first geographic region;
the server generates the expanded geographic region when the first geographic region of the client device fails to be associated with a threshold amount of popular electronic content, the expanded geographic region being associated with second data records, the second data records comprising the first data records and additional data records associated with the at least one second geographic region, and further wherein the server:
obtains geo-spatial identifiers associated with the expanded geographic region; and
retrieves, from a database, the second data records associated with the geo-spatial identifiers of the expanded geographic region;
the server selects the at least one second geographic region in the expanded geographic region based on the information identifying the relationships within the geographic data, and further wherein the server:
identifies the parent geographic region based on at least the geo-spatial identifier of the first geographic region and the information identifying the relationships;
obtains a geo-spatial identifier associated with the parent geographic region; and
identifies the child geographic region within geographic data associated with the parent geographic region based on at least the geo-spatial identifier of the parent geographic region and information identifying a corresponding relationship; and
when an amount of popular electronic content associated with the expanded geographic region exceeds the threshold amount, the popular content associated with the expanded geographic region comprises the popular electronic content associated with the first geographic region of the client device and popular electronic content associated with the at least one second geographic region.

10. The method of claim 9, further comprising:
receiving, from the client device, a request for additional electronic content.

11. The method of claim 10, further comprising:
obtaining the additional electronic content, wherein the transmitting comprises:
transmitting the additional electronic content and the identified popular electronic content to the client device.

12. The method of claim 10, wherein the request comprises the identifier of the client device.

13. An apparatus, comprising:
a storage device; and
a processor coupled to the storage device, wherein the storage device stores a program for controlling the processor, and wherein the processor, being operative with the program, is configured to:
obtain geographic data for a first geographic region associated with a client device, the geographic data comprising a geo-spatial identifier associated with the first geographic region and information identifying one or more second geographic regions and relationships between the first geographic region and corresponding ones of the second geographic region, wherein the one or more second geographic regions comprise a neighboring geographic region and a child geographic region associated with a parent of the first geographic region;
retrieve, from a database, first data records associated with the geo-spatial identifier, wherein the first data records comprise popularity data for electronic content requested by other client devices within the first geographic region
select, when the first data records fail to include a threshold number of the data records, at least one of the second geographic regions from the geographic data based on the information identifying the relationships, wherein the processor is further operative to:
identify the parent geographic region based on at least the geo-spatial identifier of the first geographic region and the information identifying the relationships;
obtain a geo-spatial identifier associated with the parent geographic region; and
identify the child geographic region within geographic data associated with the parent geographic region based on at least the geo-spatial identifier of the parent geographic region and information identifying a corresponding relationship;
generate an expanded geographic region comprising the first geographic region and the at least one second geographic region, the expanded geographic region being associated with second data records, the second data records comprising the first data records and additional data records associated with the at least one second geographic region;
determine whether the second data records include the threshold number of data records; and
process the second data records to identify popular electronic content comprising one or more web pages within the expanded geographic region, when the second data records include the threshold number of data records, the popular electronic content being generated based on the popularity data of the data records.

14. The apparatus of claim 13, wherein the processor is further configured to:
obtain geo-spatial identifiers associated with the expanded geographic region; and
retrieve, from the database, the second data records associated with the geo-spatial identifiers of the expanded geographic region.

15. The apparatus of claim 13, wherein the neighboring geographic region is proximate to the first geographic region and shares at least a portion of a boundary with the first geographic region.

16. The apparatus of claim 13, wherein the processor configured to select is further configured to:
identify the neighboring geographic region within the geographic data based on the geo-spatial identifier of the first geographic region and the relationship information.

17. The apparatus of claim 13, wherein the processor is further configured to:
receive, from a server, a device identifier of the client device and URL of a requested electronic resource;
generate a preliminary data record based on a least the received device identifier and URL; and
update the database based on the preliminary data record.

18. The apparatus of claim 13, wherein the processor is further configured to:
identify, from the database, the first data records that have been generated or updated within a predetermined period of time.

19. The apparatus of claim 18, wherein each of the first data records includes information specifying a time when the data record was generated or last updated.

20. A non-transitory computer-readable medium storing instructions that, when executed by a processor, perform a method for identifying popular electronic content in a geographic region, the method comprising:
obtaining geographic data for a first geographic region associated with a client device, the geographic data comprising:
a geo-spatial identifier associated with the first geographic region; and
information identifying one or more second geographic regions and relationships between the first geographic region and corresponding ones of the second geographic region, wherein the one or more second geographic regions comprise a child geographic region associated with a parent of the first geographic region;
retrieving, from a database, first data records associated with the geo-spatial identifier, wherein:
the first data records comprise one or more of (i) a number of requests for electronic content and (ii) a number of users that requested the electronic content within the first geographic region;
selecting, when the first data records fail to include a threshold number of the data records, at least one of the second geographic regions from the geographic data based on the information identifying the relationships, wherein the method further comprises:
identifying the parent geographic region based on at least the geospatial identifier of the first geographic region and the information identifying the relationships;
obtaining a geo-spatial identifier associated with the parent geographic region; and
identifying the child geographic region within geographic data associated with the parent geographic region based on at least the geo-spatial identifier of the parent geographic region and information identifying a corresponding relationship;

generating an expanded geographic region comprising the first geographic region and the at least one second geographic region, the expanded geographic region being associated with second data records, the second data records comprising the first data records and additional data records associated with the at least one second geographic region, wherein the method further comprises:

obtaining geo-spatial identifiers associated with the expanded geographic region; and retrieving, from the database, the second data records associated with the geo-spatial identifiers of the expanded geographic region;

determining whether the second data records include the threshold number of data records; and processing the second data records to identify popular electronic content comprising web pages within the expanded geographic region, when the second data records include the threshold number of data records, the popular web pages being identified based on at least one of the number of requests or the number of users;

delivering, to a server, URLs of the identified popular web pages so that the URLs can be communicated to the client device.

21. The non-transitory computer-readable medium of claim 20, wherein the second geographic regions comprise a neighboring geographic region.

22. The non-transitory computer-readable medium of claim 21, wherein the neighboring geographic region is proximate to the first geographic region and shares at least a portion of a boundary with the first geographic region.

23. The non-transitory computer-readable medium of claim 21, wherein the selecting step comprises:

identifying the neighboring geographic region within the geographic data based on the geo-spatial identifier of the first geographic region and the information identifying the relationships.

24. The non-transitory computer-readable medium of claim 20, wherein the method further comprises:

receiving, from a server, a device identifier of the client device and a URL of a requested electronic resource;

generating a preliminary data record based on a least the received device identifier and URL; and updating the database based on the preliminary data record.

25. The non-transitory computer-readable medium of claim 20, wherein the method further comprises:

identifying, from the database, the first data records that have been generated or updated within a predetermined period of time.

26. The non-transitory computer-readable medium of claim 25, wherein each of the first data records includes information specifying a time when the data record was generated or last updated.

27. The method of claim 1, further comprising generating the threshold number of data records based on an application of a statistical model to at least one of the first data records or the second data records.

28. The method of claim 7, further comprising determining the predetermined period of time based on at least one of a content category associated with the first data records, a volume of the first data records, or information associated with the obtained geographic region.

* * * * *

UNITED STATES PATENT AND TRADEMARK OFFICE
CERTIFICATE OF CORRECTION

PATENT NO. : 9,760,643 B2  
APPLICATION NO. : 12/757342  
DATED : September 12, 2017  
INVENTOR(S) : Palliavi Palleti et al.

Page 1 of 1

It is certified that error appears in the above-identified patent and that said Letters Patent is hereby corrected as shown below:

In Claim 24, Column 26, Line 11, "based on a least the" should read --based on at least the--.

Signed and Sealed this  
Twenty-second Day of May, 2018

Andrei Iancu  
*Director of the United States Patent and Trademark Office*